United States Patent
Zunino et al.

[19]

[11] Patent Number: 6,018,998
[45] Date of Patent: Feb. 1, 2000

[54] ACCELERATION SENSING DEVICE AND METHOD OF OPERATION AND FORMING

[75] Inventors: Helen M. Zunino, Tempe; Daniel N. Koury, Jr., Mesa, both of Ariz.

[73] Assignee: Motorola, Inc., Schaumburg, Ill.

[21] Appl. No.: 09/114,193

[22] Filed: Jul. 18, 1998

Related U.S. Application Data

[62] Division of application No. 08/640,267, Apr. 30, 1996, Pat. No. 5,806,365.

[51] Int. Cl.[7] .................................................. G01P 15/08
[52] U.S. Cl. ............................ 73/514.16; 73/514.38; 73/504.03
[58] Field of Search .................. 73/510, 511, 514.01, 73/514.12, 514.16, 514.32, 514.38, 862.381, 862.473, 862.52, 724, 754, 504.03; 324/457

[56] References Cited

U.S. PATENT DOCUMENTS

| | | |
|---|---|---|
| 4,767,973 | 8/1988 | Jacobsen ........................ 324/457 |
| 5,313,835 | 5/1994 | Dunn . |
| 5,359,893 | 11/1994 | Dunn . |
| 5,473,945 | 12/1995 | Grieff et al. . |
| 5,487,305 | 1/1996 | Ristic et al. . |
| 5,591,910 | 1/1997 | Lin . |
| 5,594,171 | 1/1997 | Ishida et al. ..................... 73/514.38 |

*Primary Examiner*—Hezron Williams
*Assistant Examiner*—Helen C. Kwok
*Attorney, Agent, or Firm*—Rennie William Dover

[57] ABSTRACT

A sensor (10) is capable of detecting linear acceleration in the three Cartesian directions and the angular acceleration about three Cartesian axes. The sensor (10) has a conductive layer (32) that is free to move or rotate in any direction. A first, second, and third set of conductors are used to sense and quantify the acceleration of the conductive layer (32). The sensor (10) can also be operated as a closed loop system with the addition of a fourth set of conductors.

9 Claims, 3 Drawing Sheets

ACCELERATION SENSING DEVICE AND METHOD OF OPERATION AND FORMING

The present application is based on prior U.S. application Ser. No. 08/640,267, filed on Apr. 30, 1996, now U.S. Pat. No. 5,806,365, which is hereby incorporated by reference, and priority thereto for common subject matter is hereby claimed.

BACKGROUND OF THE INVENTION

This invention relates, in general, to sensing devices, and more particularly to devices for sensing linear and rotational acceleration.

In navigation or positional tracking systems it is often necessary to monitor and calculate six acceleration values. The first three are linear acceleration, which quantify the rate at which an object is accelerating in the x-, y-, and z-directions. By monitoring the rate at which the object is accelerating in these directions, it is possible to calculate the relative velocity in each of these directions. It is also necessary to sense and monitor the angular or rotational acceleration of an object, which provides the final three acceleration values that are needed in many navigation systems. Rotational acceleration refers to the rate of change in angular velocity or rotational rate of an object about the x-, y-, or z-axis. In aviation systems these three accelerations are often referred to as roll, pitch, and yaw forces, respectively.

Traditional sensing devices are generally divided into two categories: those that sense linear acceleration and those that sense rotational velocity/acceleration. Many of these devices are only capable of sensing either the linear or rotational acceleration along one of the three axes. Thus, to form a tracking system that is capable of monitoring all six of the above mentioned accelerations, it may be necessary to combine several sensing devices into the tracking system. Combining several sensing devices to fulfill the necessary functionality increases the size and manufacturing cost of the tracking system.

By now it should be appreciated that it would be advantageous to increase the functionality of a sensing device so that fewer sensing devices are required by a tracking system to sense linear and rotational acceleration along all three Cartesian axes.

DETAILED DESCRIPTION OF THE DRAWINGS

In the preferred embodiment, the present invention provides a sensing device that is capable of detecting linear acceleration along a first orthogonal axis, a second orthogonal axis, and a third orthogonal axis as well as detecting all three angular accelerations about those three axes. Therefore, the present invention offers a single structure that can replace the functionality of up to six different sensing structures. Unlike a gyroscope, which detects angular velocity in various directions, the present invention detects the six major accelerations that are required for most sophisticated navigation or tracking systems. By monitoring the linear and rotational acceleration along and about a first axis of motion, a second axis of motion, and a third axis of motion, it is possible to monitor and determine the position of an object such as an airplane or an automobile in three-dimensional space as a function of time.

In general, the present invention operates by monitoring or sensing the relative movement of a conductive plate. Up to four sets of conductors are arranged under, over, and around the sides or edges of the conductive plate to sense linear acceleration along each of the Cartesian axes. Each set of conductors has a plurality of conductors that are arranged such that as the conductive plate rotates around each of the Cartesian axes, the angular acceleration can be determined as well. In the preferred embodiment, the present invention operates as a closed loop system. A closed loop capacitive accelerometer system is one in which electrostatic forces are used to maintain the conductive plate at a known position to improve the accuracy of measuring the linear acceleration along a particular direction. A further description of how such a closed loop system is formed in conjunction with the present invention will be provided below.

Figure 1:
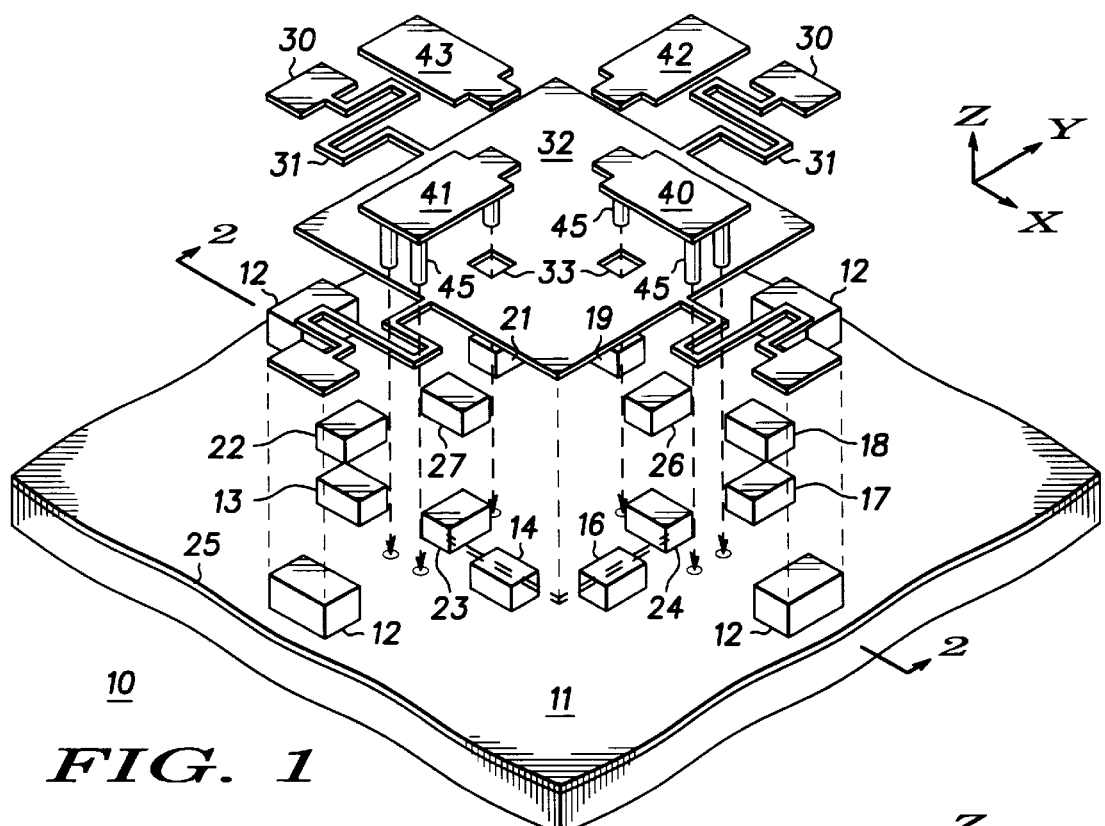
FIG. 1 is an exploded isometric view of a sensing device in accordance with the present invention.

Referring now to FIG. 1, a more detailed description of the present invention is provided. FIG. 1 is an exploded view of an acceleration sensor, a sensing device, or a sensor 10 that can be used to sense or measure the linear acceleration along the three Cartesian axes shown in FIG. 1 as well as for measuring the angular or rotational acceleration around those axes. Sensor 10 is formed on a support substrate 11 that preferably comprises a semiconductor material such as silicon. Support substrate 11 can also comprise an insulating or conductive material as well. In order to prevent interference with the electrical signals generated by sensor 10, an insulating layer 25 may be formed on support substrate 11. It should be understood that the use of insulating layer 25 is optional and will depend on the electrical properties of support substrate 11 and the environment in which sensor 10 is placed.

A first set of conductors comprising conductors 23, 24, 26, and 27 is formed overlying support substrate 11 to define a first plane and are arranged about an axis of motion. The first plane is relatively orthogonal to the z-axis and substantially parallel to the surface of support substrate 11. The first set of conductors are capacitively coupled to a conductive layer 32. Conductive layer 32 is formed from a conductive material such as doped polysilicon, a metal, or amorphous silicon and is free to move along and rotate about all three axes in response to linear and angular acceleration forces. As shown in FIG. 1, conductive layer 32 is overlying all of the conductors 23, 24, 26, and 27 of the first set of conductors and defines a second plane which is substantially parallel to the first plane of the first set of conductors. Conductive layer 32 is free to move in any direction and is supported by springs 31 that have anchor regions 30. Each of the anchor regions 30 is mounted to a support region 12 on the surface of support substrate 11.

A second set of conductors comprising conductors 13, 14, 18, and 19 is formed around the edges or sides of conductive layer 32. The second set of conductors defines a third plane which is also substantially parallel to the second plane formed by conductive layer 32. Conductors 13, 14, 18, and 19 are arranged about an axis of motion such that they can sense linear acceleration of conductive layer 32 along the y-axis. It should also be understood that the first set of conductors and the second set of conductors are preferably in the same plane, but could be offset from each other if desired.

A third set of conductors comprising conductors 16, 17, 21, and 22 is also formed around the edges or sides of conductive layer 32. The third set of conductors defines a fourth plane which is also substantially parallel to the second plane formed by conductive layer 32. It should also be understood that the first set of conductors and the third set of conductors are preferably in the same plane, but could be offset from each other if desired. Conductors 16, 17, 21, and 22 are arranged about an axis of motion such that they can sense linear acceleration of conductive layer 32 along the x-axis. As will be described in more detail below, the second set of conductors and the third set of conductors are also used to sense rotational acceleration of conductive layer 32 around the z-axis.

Also shown in FIG. 1 is a fourth set of conductors comprising conductors 40, 41, 42, 43. The fourth set of conductors defines a fourth plane which is substantially parallel and offset to the second plane defined by conductive layer 32. Conductors 40–43 are each supported by a plurality of posts 45 such that conductors 40–43 overlie conductive layer 32 and the first set of conductors. Posts 45 pass through openings 33 in conductive layer 32, which are larger than posts 45. This is so that posts 45 are physically isolated from conductive layer 32 when sensor 10 is at rest. Posts 45 also limit the maximum distance that conductive layer 32 can move in the x- and y- directions to prevent damage to sensor 10 should an excessive acceleration force be placed on conductive layer 32. A more detailed description of the formation of posts 45 is provided below.

Each conductor in the first, second, third, and fourth sets of conductors comprises a conductive material that is capacitively coupled to conductive layer 32. As conductive layer 32 moves relative to each of the conductors, the capacitance value of each conductor may change. The change in capacitance generates a voltage potential or a change in current flow that can be measured to quantify the acceleration and direction of movement of conductive layer 32. A more detailed description of how acceleration and directional values are determined by sensor 10 will be provided shortly.

Figure 2:
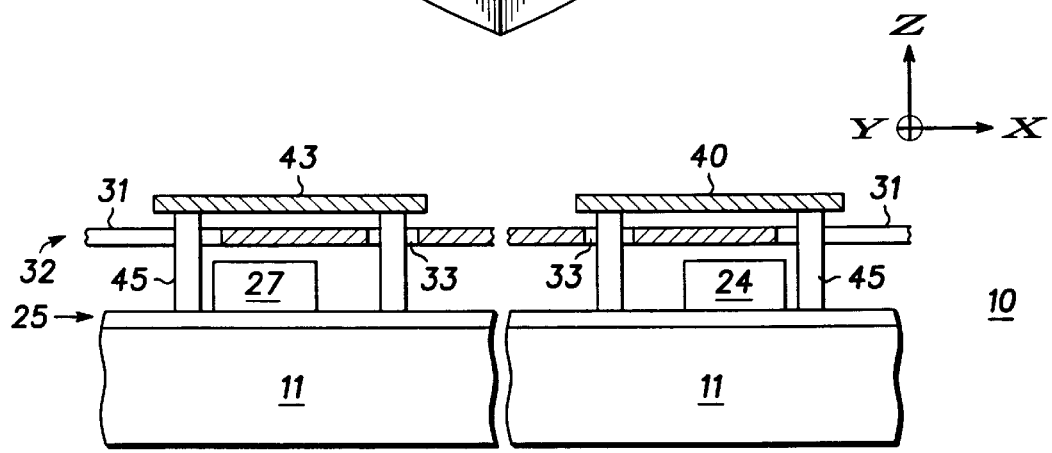
FIG. 2 is an enlarged cross-sectional view of the sensing device of FIG. 1.

Turning now to FIG. 2, a more detailed description of the configuration of the first and fourth set of conductors in relationship to conductive layer 32 is provided. FIG. 2 is an enlarged cross-sectional view of sensor 10. As shown, conductive layer 32 overlaps a portion of conductors 24 and 27 of the first set of conductors. The amount of capacitive coupling between conductive layer 32 and conductors 24 and 27 is determined in part by the surface area of the amount of overlap between conductive layer 32 and conductors 24 and 27. In addition, conductors 40 and 43 overlap or are overlying conductive layer 32, and as shown, are directly over the corresponding conductors 24 and 27 of the first set of conductors. This is to optimize the operation of sensor 10 as a closed loop system to be described later.

Figure 3:
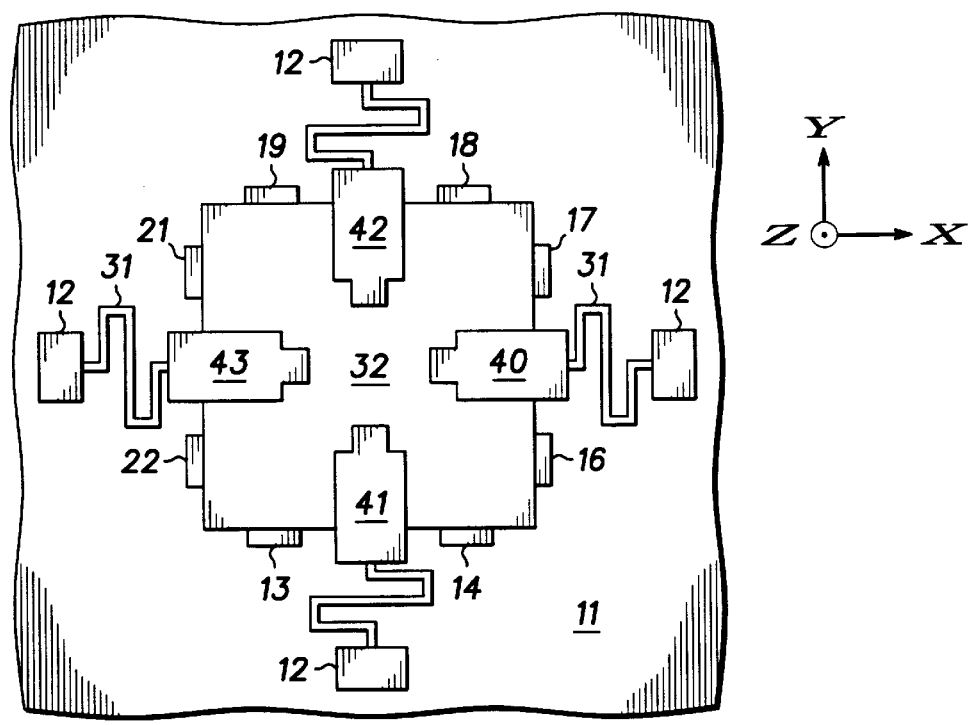
FIG. 3 is an enlarged top view of the sensing device of FIG. 1.

FIG. 3 is a top view showing conductors 13, 14, 18, and 19, conductors 16, 17, 21, and 22, and conductors 40–43 of the second, third, and fourth set of conductors, respectively, and their preferred position relative to conductive layer 32.

As shown, conductive layer 32 overlaps only a portion of the conductors of the second and third set of conductors. Again, this is only one possible configuration. Conductive layer 32 could be expanded such that it extends to the outer edge or beyond conductors 13, 14, 16, 17, 18, 19, 21, or 22.

It should be understood that the sensitivity and performance of sensor 10 can be adjusted by varying the placement, shape, or configuration of each of the conductors of the first, second, third, and fourth set of conductors. Such modification can include complete overlap of all or some of the conductors of each set of conductors and vary such that there is no overlap at all by conductive layer 32. In general, conductive layer 32 is separated from conductors 14–27 by a distance less than 3 microns and preferably by a distance of about 1.0 microns to 2.5 microns.

In FIG. 3, conductors 23, 24, 26, and 27 (see FIG. 1) are nearly completely covered by conductive layer 32. This is the preferred embodiment to maximize the capacitive coupling of conductors 23, 24, 26, and 27 to improve the performance of sensor 10. Additionally in the preferred embodiment, conductors 40, 41, 42, and 43 of the fourth set of conductors are directly overlying conductors 24, 23, 26, and 27, respectively. This is done to simplify the amount of calculation that is required by sensor 10 to control the suspension of conductive layer 32 between the first and fourth set of conductors. This is also done to balance the opposing forces applied to conductive layer 32 by the first and fourth set of conductors.

As shown in FIG. 3, conductors 13 and 14 are under a first side of conductive layer 32 and conductors 18 and 19 are under a second side. The second set of conductors are arranged such that they are equidistant from an axis parallel to the y-axis and that passes through conductors 41 and 42 to bisect sensor 10 into equal halves. This is the preferred arrangement so that if conductors 13, 14, 18, and 19 are of equal size or capacitive value, they will each generate a similar response to motion of conductive layer 32 about the z-axis. In particular, conductors 13 and 14 are equidistant from each other in relationship to the axis that divides sensor 10 into equal halves. Also shown is the arrangement of conductors 16, 17, 21, and 22 about an axis that is parallel to the x-axis and passes through conductors 40 and 43 to divide sensor 10 into equal halves. Conductors 16 and 17 are under a third side of conductive layer 32 and conductors 21 and 22 are under a fourth side.

It should also be understood that the placement of each conductor 14–27 relative to the Cartesian axes can be changed to modify the capacitive response of each conductor 14–27. The axes of motion need not pass directly through the physical center of sensor 10 as described above, nor are the directions of motion restricted to the traditional Cartesian axes. Motion can be detected with sensor 10 about any three axes that define three distinct directions such as three directions that are orthogonal to each other. The size of each conductor 14–27 can be varied, or its position relative to conductive layer 32 can also be changed, to modify the performance of sensor 10. It should also be understood that conductors 14–27 could be formed in other configurations. For example, conductors 14–27 could be arranged as a series of strips or in a comb/finger arrangement with appropriate changes to conductive layer 32.

Figure 4:
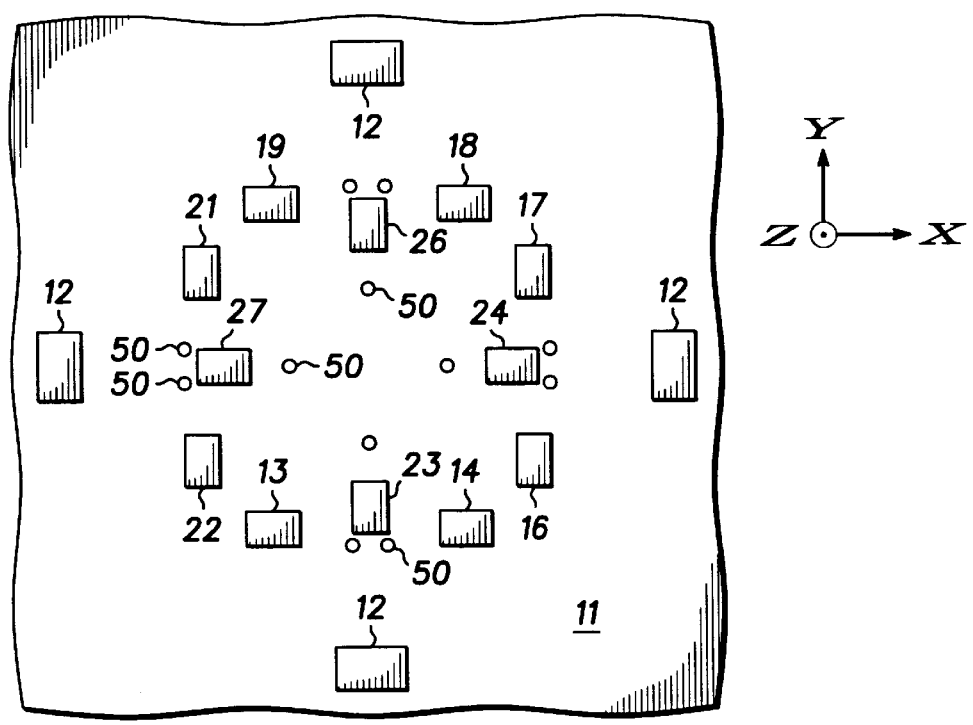
FIG. 4 is an enlarged top view of a first layer of the sensing device of FIG. 1.
Figure 5:
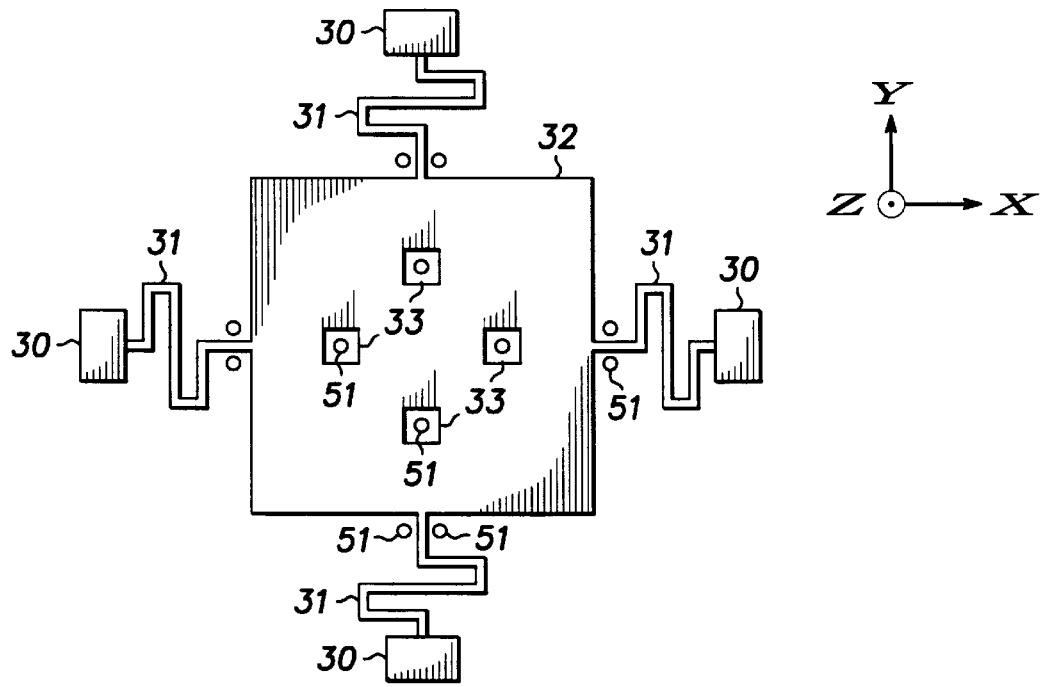
FIG. 5 is an enlarged top view of a second layer of the sensing device of FIG. 1.
Figure 6:
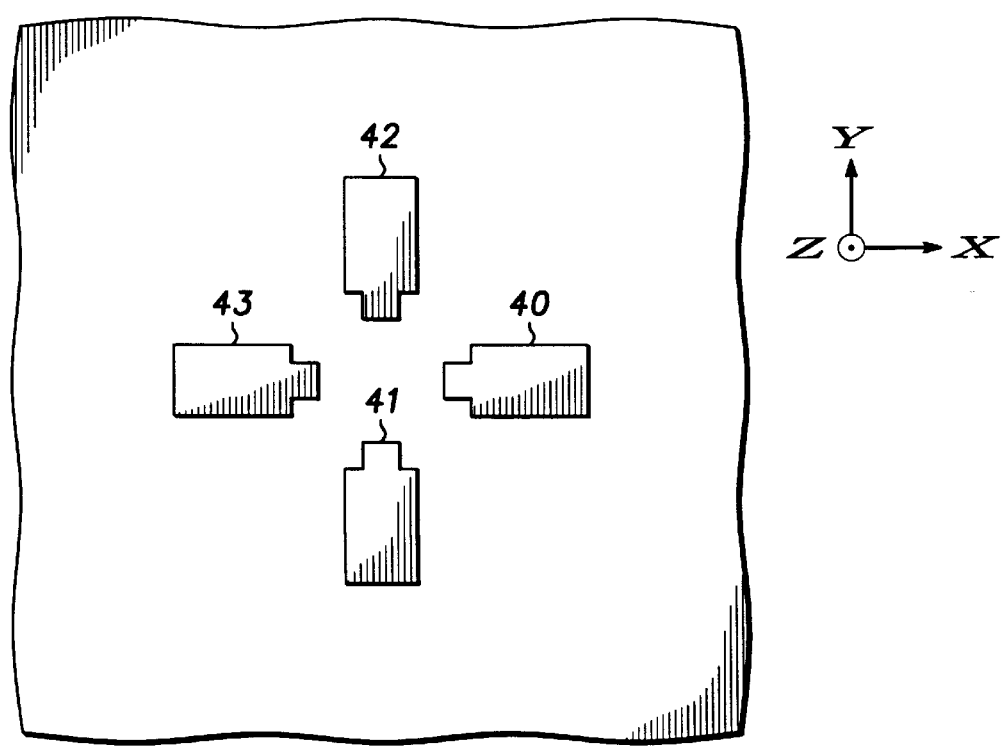
FIG. 6 is an enlarged top view of a third layer of the sensing device of FIG. 1.

Turning now to FIGS. 4–6, a detailed description regarding the fabrication of sensor 10 is provided. FIGS. 4–6 show each of the respective planes formed by the first, second, and third set of conductors (FIG. 4), conductive layer 32 (FIG. 5), and the fourth set of conductors (FIG. 6). To begin the fabrication process, a support substrate 11, such as a silicon substrate, is provided. If support substrate 11 is made from a conductive material, insulating layer 25 may be formed on support substrate 11. A first conductive material (not shown) such as doped polysilicon, amorphous silicon, aluminum, nickel, copper, tungsten, or titanium, is then formed on the surface of support substrate 11. The thickness of the first conductive layer can vary and is preferably about 50 angstroms to 5,000 angstroms thick.

The first conductive layer is then patterned with a first etch mask, such as a photoresist layer, and etched with either an isotropic etch or an anisotropic etch such as a reactive ion etch (RIE). The etch will define conductors 13, 14, 16, 17, 18, 19, 21, 22, 23, 24, 26, and 27 as well as support regions 12 shown in FIG. 4. The etch is also used to form first portion 50 of posts 45. Preferably, the surface of support substrate 11 is relatively flat so that conductors 13–27 and support regions 12 are all in the same plane. It should be understood that it is also possible to form the conductors of the first, second, and third set of conductors from different materials, each having a different thickness. It is also possible to form some or all of conductors 13–27 in recesses or raised areas on support substrate 11 so that they are not all in the same plane. Recesses include any trench structure and raised areas can be formed by localized oxidation of support substrate 11. After the etch step is completed, the first etch mask is removed to allow further processing.

Referring now to FIG. 5, a first sacrificial layer (not shown) is then formed over the first, second, and third set of conductors. The first sacrificial layer can be formed from materials such as doped silicon glass. The portion of the first sacrificial layer over support regions 12 and first portions 50 is then removed using a second mask layer (not shown) such that these regions are exposed. A second conductive material (not shown) is then formed on the sacrificial layer, support regions 12, and first portions 50. The second conductive material is about 1000 angstroms to 100,000 angstroms thick and can be formed from a variety of materials including doped polysilicon and metal. A third etch mask is then formed to expose portions of the second conductive material. A wet or dry etch is then used to remove the exposed portions of the second conductive material to form conductive layer 32 and second portions 51 of posts 45 in the configuration shown in FIG. 5. The etch step is also used to define springs 31 that contact support regions 12 at anchor regions 30 and to form openings 33. The third mask layer is then removed to allow further processing.

Turning now to FIG. 6, a second sacrificial layer (not shown) is formed on conductive layer 32 and is patterned to expose second portions 51 of posts 45 using a fourth etch mask. A third conductive material (not shown) is then formed on the second sacrificial layer and second portions 51. The second conductive material is about 1000 angstroms to 100,000 angstroms thick and can be formed from a variety of materials including doped polysilicon and metal. A fifth etch mask is then formed to expose portions of the third conductive material. A wet or dry etch is then used to remove the exposed portions of the third conductive material to form conductors 40–43 of the fourth set of conductors as shown in FIG. 6. The fifth mask layer is then removed to allow further processing.

A wet etch process is then performed, which removes the first and second sacrificial layers. This will release conductive layer 32 so that it is free to move about all three Cartesian axes. Conductive layer 32 will be suspended over the first, second, and third set of conductors by springs 31. In addition, conductors 40–43 of the fourth set of conductors will be suspended over conductive layer 32 by the combination of first portion 50, second, portion 51 and the third conductive layer, which make up posts 45. It should be understood that the number and configuration of posts 45 may vary.

Figure 7:
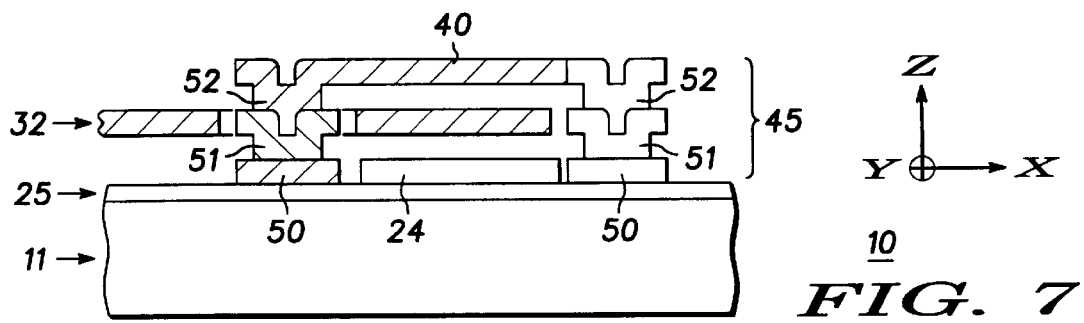
FIG. 7 is an enlarged cross-sectional view of a portion of the sensing device of FIG. 1.

FIG. 7 is an enlarged cross-sectional view of a portion of sensor 10 and is used to illustrate the formation of posts 45. First portion 50 and second portion 51 of posts 45 are formed from the first and second conductive material, respectively. The third conductive material is formed such that it contacts second portion 51 to provide a third portion 52 of post 45.

Referring now to FIG. 1, a method of operating sensor 10 to sense both linear and rotational acceleration is provided. Voltage potentials are placed on each of the conductors of the first, second, third, and fourth set of conductors and a different voltage potential is placed on conductive layer 32. External circuitry (not shown) is used to detect and measure the change in capacitance between each of the conductors and conductive layer 32. The measurement technique may involve varying the applied potentials with time.

For example, if conductive layer 32 is forced in the x-direction as a result of an external negative acceleration or deceleration in the x-direction, conductive layer 32 will move towards conductors 16 and 17 and away from conductors 21 and 22. This will cause conductive layer 32 to overlap more of conductors 16 and 17 and less of conductors 21 and 22. As a result, the capacitance will increase between conductive layer 32 and conductors 16 and 17 and will decrease between conductive layer 32 and conductors 21 and 22. The amount of increase in capacitance of conductors 16 and 17 is then compared to the amount of decrease in capacitance of conductors 21 and 22 by the external circuitry to quantify the amount of change in acceleration in the x-direction.

The amount of angular acceleration about the x-axis is determined using conductors 23 and 26 of the first set of conductors and conductors 42 and 41 of the fourth set of conductors. If conductive layer 32 rotates about the x-axis such that conductive layer 32 moves towards conductors 23 and 42 and thus away from conductors 26 and 41, then the amount of angular acceleration can be determined by external differential circuitry by comparing the increase in capacitance between conductive layer 32 and conductors 23 and 42 versus the decrease in capacitance between conductive layer 32 and conductors 26 and 41. Both the linear and angular acceleration about the y-axis can be determined by using the appropriate conductors of the third and fourth set of conductors in a similar manner as described above for the x-axis.

Linear acceleration in the z-direction is determined in a slightly different manner. For example, if conductive layer 32 should be forced towards conductors 40–43 and thus away from conductors 13, 14, 18, and 19, the capacitance of conductors 40–43 will increase and the capacitance of conductors 13, 14, 18, and 19 will decrease. External differential circuitry can then be used to compare the increase in capacitance of conductors 40–43 versus the decrease in capacitance of conductors 13, 14, 18, and 19 to quantify the amount of linear acceleration of conductive layer 32 in the z-direction.

Angular acceleration about the z-axis is determined by comparing the change in capacitance of conductive layer 32 and conductors 18, 16, 13, and 21 against the change in capacitance between conductive layer 32 and conductors 14, 17, 19, and 22. As mentioned earlier, sensor 10 is preferably operated in a closed loop manner by applying a controlled and calculated electrostatic force to the conductors of the first and fourth set of conductors so that conductive layer 32 is maintained in a neutral, at rest position. This improves the accuracy of the external differential circuitry in the sensing of linear and angular acceleration about the z-axis. However, it should be understood that the use of the fourth set of conductors is optional and it is possible to operate sensor 10 as an open loop system. It is also possible to add additional conductors above conductive layer 32 to operate the conductors of the second and third set of conductors in a closed loop mode.

The following table is provided to summarize the conductors that are used to sense the linear and angular acceleration about each of the three Cartesian axes:

| Acceleration | Conductors Used |
|---|---|
| Linear x-direction | 17 and 16 vs. 21 and 22 |
| Linear y-direction | 19 and 18 vs. 13 and 14 |
| Linear z-direction | 23, 24, 26, and 27 vs. 40–43 |
| Rotational about x-axis | 26 and 41 vs. 23 and 42 |
| Rotational about y-axis | 27 and 43 vs. 24 and 40 |
| Rotational about z-axis | 13, 21, 18, 16 vs. 14, 22, 19, 17 |

In the preferred embodiment described above, each of the first, second, third, and fourth set of conductors comprised four conductors. However, it should also be understood that each set of conductors can have as few as two or a plurality of conductors to adjust the performance of sensor 10. The number and configuration of conductors in each set will affect the complexity of the calculation that must be made by external differential circuitry to determine the appropriate linear and angular acceleration. It is possible to operate sensor 10 such that not all six of the linear and angular acceleration values are determined. For example, it is possible to operate sensor 10 such that linear acceleration in the three directions is determined, but only the angular acceleration about the x- and y-axes is determined by the external differential circuitry.

By now it should be appreciated that the present invention provides a sensor that can be operated to detect the linear and angular acceleration about all three Cartesian directions and axes. The present invention also provides a method for forming the sensor using conventional process steps. Since the present invention can be used to detect six quantities of acceleration, it can perform the functionality of many individual sensors that are each only able to sense acceleration in one direction. As a result, the present invention can reduce the complexity and manufacturing cost of a navigational or positional tracking system. The present invention can be part of an integrated circuit with other semiconductor devices and be used for example, to monitor the position of an automobile.

We claim:

1. A semiconductor device on a support substrate comprising:
    a conductive layer that has a first edge, a second edge, a third edge, and a fourth edge, the first edge is opposed to the second edge and the third edge is opposed to the fourth edge, wherein the conductive layer is free to move in a first direction, a second direction, and a third direction, and the first direction, the second direction, and the third direction are orthogonal to each other;
    a first conductor under the conductive layer;
    a second conductor under the first edge of the conductive layer;
    a third conductor under the second edge of the conductive layer;
    a fourth conductor under the third edge of the conductive layer;
    a fifth conductor under the fourth edge of the conductive layer; and
    a sixth conductor overlying the conductive layer and substantially directly over the first conductor.

2. The semiconductor device of claim 1, wherein voltage potentials coupled to the first conductor and the sixth conductor suspends the conductive layer between the first conductor and the sixth conductor.

3. The semiconductor device of claim 1 wherein the second conductor is capacitively coupled to the conductive layer.

4. An integrated circuit comprising the semiconductor device of claim 1.

5. A positional tracking system comprising the semiconductor device of claim 1.

6. An automobile comprising the semiconductor device of claim 1.

7. An apparatus comprising:
    a conductive layer that has a first edge, a second edge, a third edge, and a fourth edge, the first edge being opposed to the second edge and the third edge being opposed to the fourth edge, wherein the conductive layer is free to move in a first direction, a second direction, and a third direction, and the first direction, the second direction, and the third direction are orthogonal to each other;
    a first conductor under the conductive layer;
    a second conductor under the first edge of the conductive layer;
    a third conductor under the second edge of the conductive layer;
    a fourth conductor under the third edge of the conductive layer;
    a fifth conductor under the fourth edge of the conductive layer; and
    a sixth conductor overlying the conductive layer and substantially directly over the first conductor.

8. The apparatus of claim 7, wherein a voltage potential placed between the first conductor and the sixth conductor suspends the conductive layer between the first conductor and the sixth conductor.

9. The apparatus of claim 7 wherein the second conductor is capacitively coupled to the conductive layer.

* * * * *

UNITED STATES PATENT AND TRADEMARK OFFICE
CERTIFICATE OF CORRECTION

| | | |
|---|---|---|
| PATENT NO. | : 6,018,998 | Page 1 of 1 |
| DATED | : February 1, 2000 | |
| INVENTOR(S) | : Simon Hwang and Hae Sung Chung | |

It is certified that error appears in the above-identified patent and that said Letters Patent is hereby corrected as shown below:

<u>Title page,</u>
Item [22], "July 18, 1998", and it should read -- July 13, 1998 --.

Signed and Sealed this

Ninth Day of July, 2002

*Attest:*

*Attesting Officer*

JAMES E. ROGAN
*Director of the United States Patent and Trademark Office*